United States Patent [19]

Durham et al.

[11] Patent Number: 5,409,522

[45] Date of Patent: Apr. 25, 1995

[54] MERCURY REMOVAL APPARATUS AND METHOD

[75] Inventors: Michael D. Durham, Castle Rock; David E. Hyatt, Littleton; Robin M. Stewart, Arvada; Richard J. Schlager, Aurora, all of Colo.

[73] Assignee: ADA Technologies, Inc., Englewood, Colo.

[21] Appl. No.: 230,055

[22] Filed: Apr. 20, 1994

[51] Int. Cl.$^6$ .............................................. B01D 61/00
[52] U.S. Cl. ....................................... 75/670; 210/650; 423/210
[58] Field of Search .................... 75/670; 423/210; 210/65

[56] References Cited

U.S. PATENT DOCUMENTS

| | | | |
|---|---|---|---|
| 3,232,033 | 2/1966 | Williston et al. | 55/387 |
| 3,693,323 | 9/1972 | Gant | 55/72 |
| 3,884,639 | 5/1975 | Sugiyama | 23/230 PC |
| 3,933,431 | 1/1976 | Trujillo et al. | 23/232 R |
| 4,094,777 | 6/1978 | Sugier et al. | 210/32 |
| 4,419,107 | 12/1983 | Roydhouse | 55/5 |
| 4,892,567 | 1/1990 | Yan | 55/33 |
| 4,909,926 | 3/1990 | Yan | 208/253 |
| 5,114,581 | 5/1992 | Goldsmith et al. | 210/650 |
| 5,141,724 | 8/1992 | Audeh et al. | 423/210 |
| 5,221,484 | 6/1993 | Goldsmith et al. | 210/650 |

OTHER PUBLICATIONS

Munthe et al., "Removal of Gaseous Mercury From Air Using a Gold Coated Denuder," *Atmospheric Environment*, vol. 24A, No. 8, pp. 2271–2274, 1990.
Temmerman et al., "Sensitive Determination of Gaseous Mercury in Air by Color Vapour Atomic Flourescence Spectrometry After Amalgamation," *Analytica Chimica Acta*, 236 (1990) 371–376.
Butler et al., "Hg Adsorption on Optically Thin Au Films," *J. Appl. Phys.*, 67(9), pp. 3420–4326, May 1990.
George et al., "Investigation of Mercury Adsorption on Gold Films by STM," *Journal of Microscopy*, vol. 152, pt. 3, Dec. 1988, pp. 703–713.
Nguyen, "Adsorbents for Mercury Vapor Removal," *Journal of the Air Pollution Control Association*, Mar. 1979, vol. 29, No. 3, pp. 235–237.
Mercer, "Adsorption of Mercury Vapor by Gold and Silver," *Analytical Chemistry*, vol. 51, No. 7, Jun. 1979, pp. 1026–1030.
Sittig, *Pollutant Removal Handbook*, 1973, pp. 286–294.

*Primary Examiner*—Peter D. Rosenberg
*Attorney, Agent, or Firm*—Sheridan Ross & McIntosh

[57] ABSTRACT

The present invention discloses an apparatus and process for removing particulate material and mercury-containing compounds from a gas stream. The apparatus includes a particulate removal means to remove the particulate material and a mercury collection means to remove the mercury-containing compounds. The apparatus can selectively remove particulate material and mercury-containing compounds which may be disposed of separately. The mercury collection means is positioned downstream of the particulate removal means and includes a regenerable sorbent. The sorbent is regenerated by elevating the temperature of the sorbent to release the mercury-containing compounds from the sorbent.

40 Claims, 9 Drawing Sheets

MERCURY REMOVAL APPARATUS AND METHOD

FIELD OF THE INVENTION

The present invention relates to a system for the removal of particulate material and mercury compounds from a gas stream and in particular to a system for the removal of fly ash and mercury compounds from flue gas streams produced by utilities, refineries, incinerators, and other similar facilities.

BACKGROUND OF THE INVENTION

Environmental standards for particulate and total mercury emissions by coal-fired power plants, petroleum refineries, chemical refineries, incinerators, metallurgical operations, thermal treatment units, and other particulate- and mercury-emitting facilities are becoming increasingly more demanding. Emissions of particulate material are already strictly regulated for such facilities. New regulations are currently under development not only to amend existing regulations to reduce further permissible levels of total mercury emissions for such facilities but also to regulate total mercury emissions from a wide variety of other types of operations not presently subject to such regulations. As used herein, "total mercury emissions" refers to the concentration of mercury in the gas stream in whatever form (e.g., whether in elemental form or compounded with other elements).

Electrostatic precipitators and filters are two common particulate removal systems for removing particulate material from a gas stream. In electrostatic precipitators, electrodes impart a negative electrical charge to the particulate material. The charged particulate material migrates to positively charged collection plates where the material is collected. The collected particulate material is periodically removed from the collection plates for disposal.

Electrostatic precipitators have limitations in many applications. Electrostatic precipitators are unable to remove effectively particulate material having inadequate resistivity to retain an electrical charge. For particulate material that can retain an electrical charge, the particle collection efficiency of electrostatic precipitators has been found to decrease over time. It is believed that the decrease is primarily a result of electrical spark over from the collection plates to the electrodes.

As a result of the limitations of electrostatic precipitators in many applications, a number of operations use filtration rather than electrostatic precipitators to remove particulate material from gas streams. In filtration systems, a filter contains pores smaller than the size of the particulate material to collect the particulate material on the filter as a collected particulate material layer and yield a treated gas stream. The collected particulate material layer is typically removed from the filter by ceasing the flow of the gas stream through the filter and contacting the filter with a reverse flow of a gas. The reverse gas flow dislodges the collected particulate material layer from the filter, and the dislodged layer falls into a hopper for disposal. As can be appreciated, a design objective for such filters is to minimize the frequency of cleaning of the filter, thereby keeping the filter operational for as long as possible.

A variety of filter types can be used. For example, filters may be composed of various types of fabrics. More recently, a new type of filter has been proposed which combines more than 99% retention efficiency for 5 micron or larger particulate material with stability of the filter at high temperatures. The filter is composed of thermally stable materials, including ceramics, glass bonded ceramics, glasses, and sintered metals.

While the above-described particulate removal systems remove particulate material, neither electrostatic precipitators nor filters remove vaporous forms of mercury from the gas stream, requiring the systems to be modified for mercury removal. In particular in coal-fired power plants, a variety of sorbents are often introduced upstream of the filter to remove mercury from the flue gas. The sorbents are recovered by the filter as part of the collected particulate material layer. As used herein, "sorbent" refers to a substance that absorbs, adsorbs, or entraps another substance.

The efficiency of sorbents frequently utilized for mercury removal in facilities of the above-noted nature are often inadequate for meeting the increasing regulatory demands concerning total mercury emissions. Additionally, such sorbents typically do not remove all forms of mercury. Since certain types of fuels or raw materials produce only certain forms of mercury when consumed, it is therefore often necessary to base the selection of the specific sorbent to be used upon the chemical composition of the fuel or raw material to be consumed in the operation.

Additional limitations exist with respect to known techniques for using sorbents in facilities of the above-noted nature. Specifically, because the mercury-containing sorbents are recovered as part of the collected particulate material layer, the use of sorbents typically exchanges a contaminated waste gas problem for a contaminated solid waste problem. Generally, a substantial amount of sorbent is required to treat a gas stream containing dilute concentrations of mercury. The collected particulate material layer containing the sorbent can be difficult to store, transport and dispose of. Depending upon the application, the storage and disposal of mercury-containing solid waste is stringently regulated. Further, it is difficult to remove the mercury from the collected particulate material layer. In this regard, the removal of the mercury is generally impractical due to the dilute mercury concentrations in the collected particulate material layer and the volume of material in the layer. As a result, sorbents generally are not regenerable but are typically discarded after use due to the high costs to recover the sorbent from the layer and recycle the recovered sorbent.

SUMMARY OF THE INVENTION

An objective of the present invention is to provide a system that efficiently removes particulate material and mercury from a gas stream.

Another objective is to provide a system that can separately recover from a gas stream particulate material and mercury. A related objective is to provide a system that allows for the separate disposal of particulate material and mercury removed from the gas stream. Another related objective is to provide a system for the removal of mercury from a gas stream and regeneration of the sorbent used to recover the mercury.

Another objective is to provide a system for the removal of particulate material and mercury from a gas stream which can be readily implemented in a wide variety of existing types of facilities.

Another objective is to provide a system that realizes one or more of the above-noted objectives without significantly increasing the downtime of the system for removing the collected particulate material layer from the particulate removal system or regenerating the sorbent, compared to the system downtime for removing the layer from existing particulate removal systems.

The present invention realizes one or more of the above objectives by providing an apparatus for the removal of particulate material and mercury-containing compounds from an input gas stream. The apparatus is particularly applicable to gas streams produced by coal-fired power plants, petroleum refineries, chemical refineries, incinerators, metallurgical operations, and thermal treatment units. Such facilities typically have an input gas stream having a temperature less than about 600° F.

The apparatus of the present invention includes: (i) a channel having an inlet and outlet for the input gas stream; (ii) a particulate removal means positioned across the gas stream in the channel for removing particulate material from the input gas stream; (iii) a mercury collection means for removing the mercury-containing compounds from the input gas stream, with the mercury collection means being positioned downstream of the particulate removal means within a defined region of the channel and including a mercury collection surface; (iv) a means for selectively elevating the temperature within the defined region to release the mercury-containing compounds from the collection surface; and (v) a means for removing the mercury-containing compounds from the defined region after the mercury-containing compounds are released from the collection surface. As used herein, "mercury-containing compounds" refers to mercury in whatever form, e.g., whether elemental or compounded with other elements. Examples of mercury-containing compounds include elemental mercury, mercuric chloride, organomercuric compounds, other ionic and oxidized forms of mercury, and mixtures thereof.

The particulate removal means is preferably a filter having a pore size smaller than the particulate material in the input gas stream. More preferably, the filter has a pore size less than about 5.0 microns. In some embodiments, the particulate removal means can alternatively be an electrostatic precipitator.

The defined region defines a space within the channel which can be isolated by a sealing means from the remainder of the channel for removal of the mercury-containing compounds from the mercury collection surface. During regeneration, the temperature within the defined region is generally increased to cause the mercury-containing compounds to be released from the collection surface. The released mercury-containing compounds are removed from the defined region, generally by a carrier gas or a vacuum apparatus.

For many applications, it is preferred that the particulate removal means and mercury collection means both be located in the defined region. In this regard, both the particulate removal means and mercury collection means will be elevated from a first temperature of no more than about 600° F. to a second temperature greater than the first temperature but no less than about 500° F. to regenerate the mercury collection surface. It is important to use particulate filters as the particulate removal means that are thermally stable at temperatures less than about 800° F. Suitable materials include ceramics, glass bonded ceramics, glasses, sintered metals, cermets, resins, organic polymers, and combinations thereof. Materials that are thermally instable at temperatures up to about 800° F., such as fabric filters, are typically undesirable for treatment of input gas streams in many types of facilities (e.g., coal-fired power plants, petroleum refineries, chemical refineries, incinerators, metallurgical operations, and thermal treatment units).

The mercury collection surface should possess certain properties. The mercury collection surface should have a mercury adsorptive capacity no less than about 0.1 microgram/$cm^2$. The surface should also have an ability to be regenerated no less than about 10 times with no more than a 50% decrease in mercury adsorptive capacity. As will be appreciated, the need to frequently regenerate the mercury collection surface can increase system downtime over existing particulate removal systems.

Additionally, the mercury collection surface preferably has a mercury desorption temperature greater than the temperature of the input gas stream. As will be appreciated, the mercury desorption temperature varies depending on the type of mercury collection surface. The input gas stream in many types of facilities (e.g., coal-fired power plants, petroleum refineries, chemical refineries, incinerators, metallurgical operations, and thermal treatment units) typically has a temperature less than about 600° F. For effective collection of mercury, the mercury desorption should be greater than the temperature of the input gas stream, and preferably greater than about 500° F.

The mercury collection surface should preferably have a thickness ranging from about 5 to about 500 angstroms. Suitable mercury collection surfaces for realizing one or more of the above-noted desirable properties include gold, silver, sodium, palladium, potassium, platinum, copper, and mixtures thereof, with the most preferred collection surface being gold.

For efficient removal of mercury-containing compounds, the mercury collection surface should have a surface area ranging from about 1 to about 100 $m^2$/gram; thermal stability at temperatures below about 800° F.; and a coefficient of thermal expansion no more than about $1 \times 10^{-5}$ cm/cm. As used herein, "thermal stability" refers to a material that is inflammable at and has a melting point no less than a specified temperature. Suitable surfaces include carbons, zeolites, ceramics, spun materials, metal sinters, aluminas, and mixtures thereof.

The mercury collection means may contact a surface of the particulate removal means. In one embodiment of the invention, the mercury collection surface is defined by separate mercury collection surfaces on separate carriers. In this embodiment, the separate carriers are generally supportably engaged by a surface of the particulate removal means.

In particular, one embodiment of the particulate removal means includes a plurality of first and second interconnected channels extending longitudinally relative to the direction of flow of the input gas stream. The first interconnected channels have an inlet for the input gas stream and a porous surface to remove the particulate materials from the input gas stream, and the second interconnected channels have an outlet to discharge a treated gas stream.

The mercury collection means can be disposed in a variety of locations on the particulate removal means. The mercury removal means can be disposed within either the first or second interconnected channels, typically either in or adjacent to the porous surface used for particulate material removal. In one embodiment, the mercury collection means is removably disposed within the second interconnected channels, with the outlet of the second interconnected channels including a retaining wall for holding the mercury collection means in the second interconnected channels. In another embodiment, the mercury collection means is attached to the outlet of the second interconnected channels.

In another embodiment, the mercury collection means and the particulate removal means do not physically contact one another. In this embodiment, the particulate removal means is generally located upstream of the mercury collection means. This embodiment is particularly applicable to retrofitting existing particulate removal systems to remove mercury-containing compounds.

The means for selectively elevating the temperature within the defined region is used to regenerate the mercury collection surface by releasing mercury-containing compounds from the surface. The means can include a heater in contact with the channel, the particulate removal means, and/or the mercury removal means.

The means for removing the released mercury-containing compounds from the defined region preferably includes an injection means for injecting a carrier gas into the defined region to entrain the mercury-containing compounds in the gas. The means can also include a means for removing the carrier gas from the defined region.

The means for removing the mercury-containing compounds can further include a means for recovering the mercury-containing compounds released from the mercury collection surface. The means for recovering the mercury-containing compounds typically includes a condensation surface to condense the mercury-containing compounds released from the mercury collection surface.

In a related aspect of the invention, a method for removing particulate material and mercury-containing compounds from a gas stream is disclosed. The method includes the steps of: (i) directing an input gas stream containing the particulate material and mercury-containing compounds through a particulate removal device to collect the particulate material and provide a treated gas stream with a reduced content of the particulate material; (ii) contacting the treated gas stream with a mercury collection surface; (iii) adsorbing the mercury-containing compounds on the mercury collection surface to provide an output gas stream; (iv) elevating the temperature of the mercury collection surface to release the mercury-containing compounds from the mercury collection surface; and (v) collecting the mercury-containing compounds released from the mercury collection surface. As used herein, "adsorb" and "adsorption" refer to the adherence of atoms, ions, or molecules of a gas or liquid to the surface of another substance (e.g., the mercury collection surface).

The mercury-containing compounds can be adsorbed on the mercury collection surface by amalgamating elemental mercury with a metal selected from Groups IA, IB and III of the Periodic Table of Elements. As used herein, "amalgam" refers to a mixture or alloy of mercury with a metal applied to the mercury collection surface.

The mercury collection surface is regenerated by elevating the temperature of the mercury collection surface in the defined region to release the mercury-containing compounds from the surface. Before elevating the temperature, the defined region should be sealed from the input gas stream. The surface is generally elevated from a first temperature of no more than about 600° F. to a second temperature greater than the first temperature but no less than about 500° F. The released mercury-containing compounds can be removed by contacting them with a carrier gas.

The released mercury-containing compounds typically are substantially elemental mercury vapor and the collecting step can include condensing the vapor. The vapor can be condensed by contacting the vapor with a condensation surface having a temperature less than the dew point. As used herein, "dew point" refers to the temperature at which a gas is saturated with respect to elemental mercury vapor.

The rate of flow of the carrier gas is an important consideration in condensing the mercury vapor. Preferably, the rate of flow of the carrier gas is substantially less than the rate of flow of the input gas stream, more preferably the carrier gas has a rate of flow at least 1,000 times less than the input gas flow rate. In this manner, the carrier gas has a substantially higher mercury concentration that the input gas stream and recovery of the mercury from the carrier gas by condensation or other techniques is significantly improved.

The particulate removal means is generally a filter. The filter is regenerated by contacting the filter with a cleaning gas stream having a direction of flow opposite the direction of flow of the input gas stream. The cleaning gas stream dislodges the layer of collected particulate material from the filter. The dislodged layer of particulate material can be collected for disposal.

The present invention addresses the limitations of conventional particulate removal and mercury collection systems. In some embodiments, the present invention uses a mercury collection surface that removes substantially all mercury-containing compounds from the input gas stream. In comparison, conventional sorbents used for mercury collection typically are able to remove from the input gas stream only a few of the many types of mercury-containing compounds.

The present invention provides a system that not only separately collects but also separately recovers and disposes of the mercury-containing compounds in the input gas stream. The separately recovered mercury-containing compounds of the present invention can be separately disposed of or sold, as desired. Existing particulate and mercury removal systems produce a collected particulate material layer containing not only the particulate material but also mercury-containing compounds. The layer is far more voluminous than the mercury-containing compounds recovered by the present invention. As such, the cost to dispose of the layer is significantly higher than the cost to dispose of the recovered mercury-containing compounds of the present invention. Surprisingly, the recovered mercury-containing compounds can have sufficient purity to be sold to users of mercury.

The present invention provides a system that employs a regenerable mercury collection surface. The ability of the mercury collection surface to be regenerated significantly reduces costs over conventional sorbents, which are typically not regenerable.

The present invention can be readily implemented in a wide variety of existing types of facilities, especially facilities using filtration to remove particulate material.

The present invention can be readily applied to the filters already used in such facilities.

The present invention can provide a mercury collection surface that realizes one or more of the above advantages without increasing the downtime for servicing the particulate removal means and the mercury collection means relative to the downtime of existing particulate removal systems. The mercury collection surface can be selected so that it needs to be regenerated less frequently than the particulate removal means and, in fact, can be regenerated at the same time the particulate removal means is cleaned.

These and other advantages are disclosed by the various embodiments of the present invention discussed in detail below.

DETAILED DESCRIPTION

Figure 1:
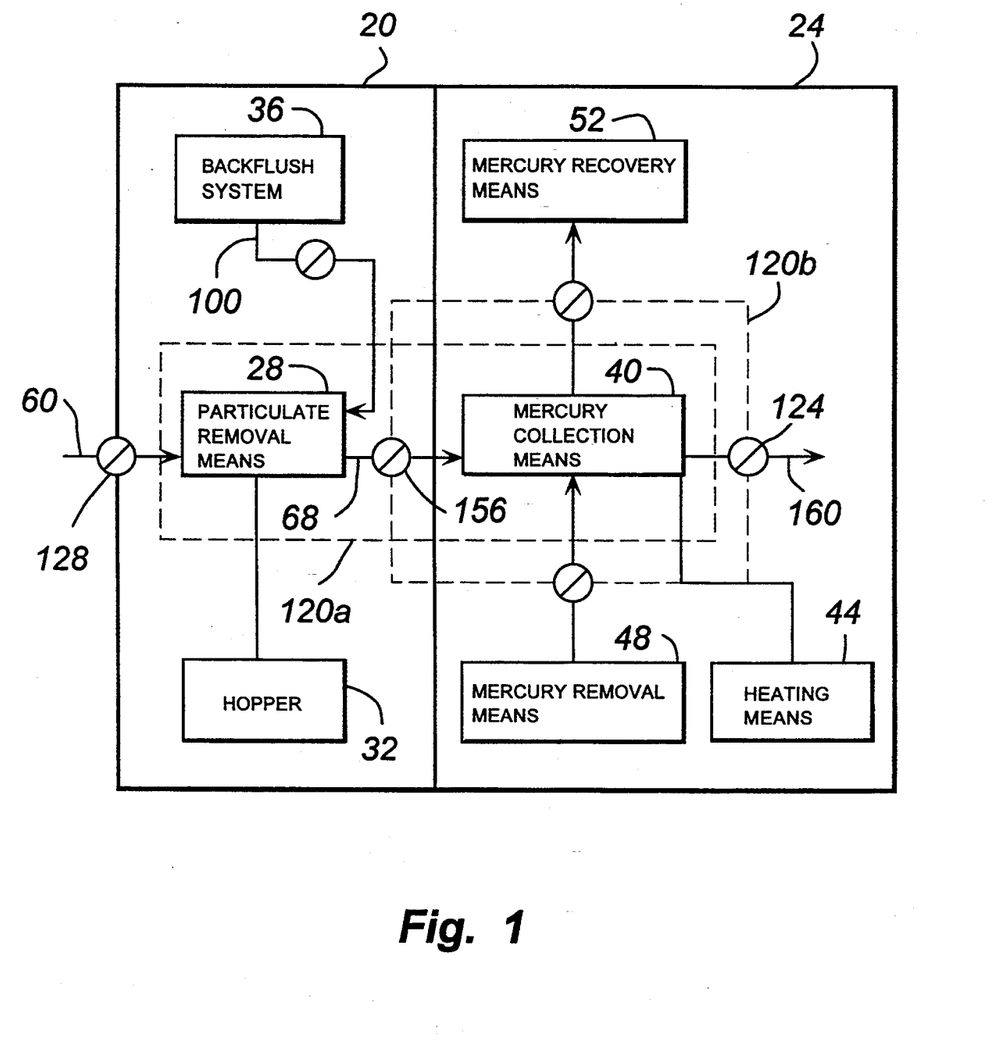
FIG. 1 is a flow schematic showing system configuration of the present invention.

Referring to FIG. 1, the present invention provides an improved system for the removal of particulate material and mercury-containing compounds from an input gas stream. The improved system efficiently removes from an input gas stream 60 not only particulate material but also mercury-containing compounds having concentrations ranging from about 0.1 to about 1,000 ppb(v/v).

The improved system includes a particulate removal assembly 20 and mercury removal assembly 24. The particulate removal assembly 20 includes a particulate removal means 28, and a hopper 32. The particulate removal assembly 20 further includes a backflush system 36 if the particulate removal means 28 is a filter. The mercury removal assembly 24 includes a mercury collection means 40, a heating means 44, a mercury removal means 48, and a mercury recovery means 52.

Figure 2:
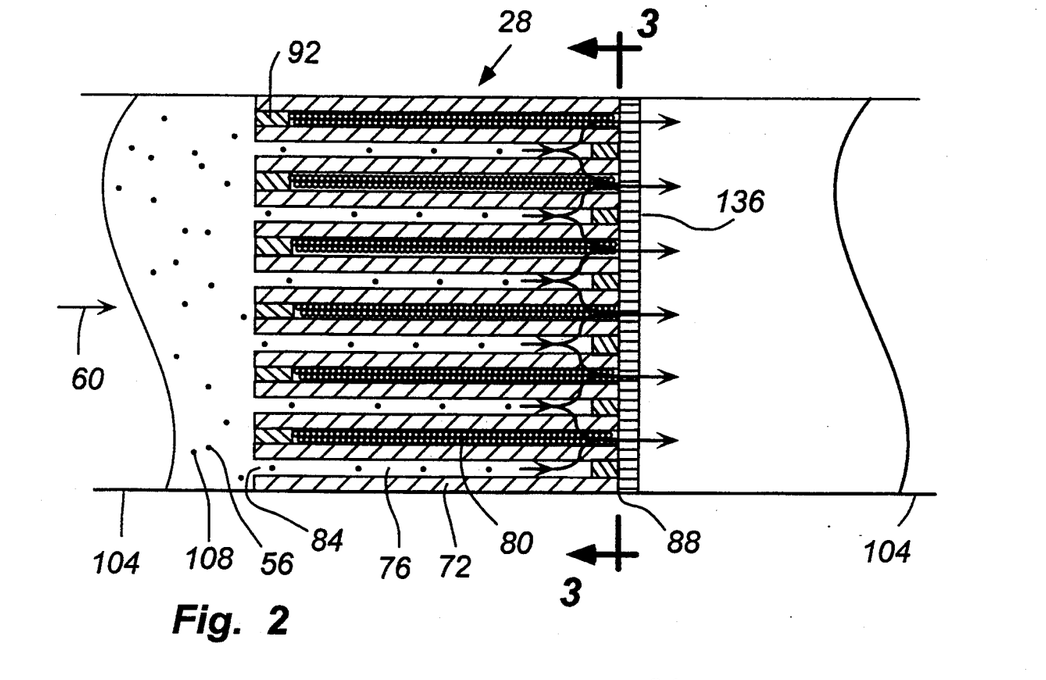
FIG. 2 is a cross-sectional illustration of one embodiment of the particulate removal means and the mercury collection means.
Figure 2A:
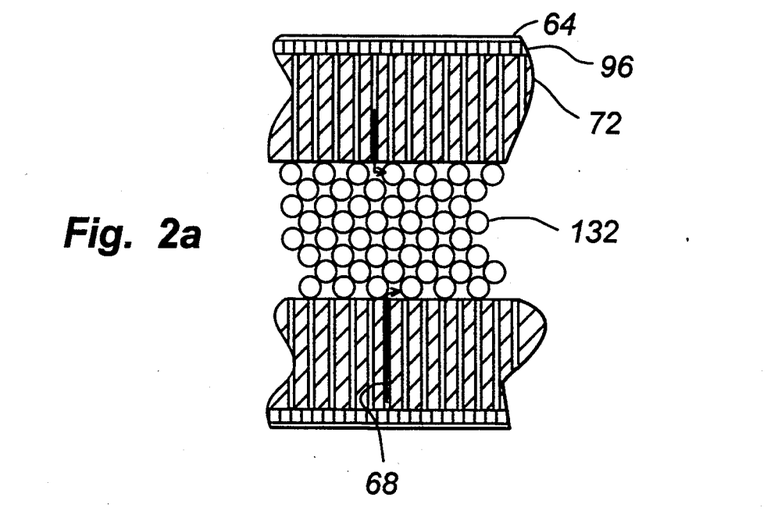
FIG. 2a is an expanded, cross-sectional illustration of a portion of the second interconnected channels in the embodiment of FIG. 2.
Figure 3:
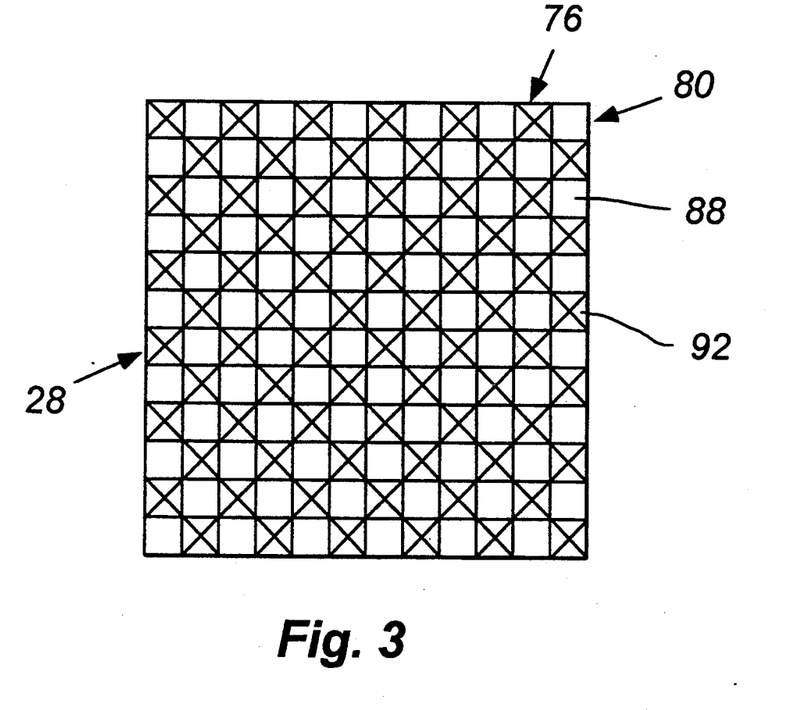
FIG. 3 is an end view of the particulate removal means illustrated in FIG. 2.

The particulate removal means 28 in the particulate removal assembly 20, as illustrated by FIGS. 2 and 3, removes particulate material 56 from the input gas stream 60 to form collected particulate material layer 64 and provide a treated gas stream 68. The particulate removal means 28 includes porous walls 72, forming a series of first and second interconnected channels 76, 80 extending longitudinally relative to the direction of flow of the input gas stream 60. The first interconnected channels 76 have an inlet 84 for entry of the input gas stream 60 with the outlet 88 containing a plug 92. The second interconnected channels 80 have an inlet 84 containing a plug 92 and an outlet 88 for the exit of the treated gas 68.

As shown in FIG. 3, the first and second interconnected channels 76, 80 are alternated by inserting plugs 92 in the outlet 88 to form first interconnected channels 76 and the inlet 84 to form second interconnected channels 80.

The particulate removal means 28 should have a pore size sufficient to remove the desired range of particulate materials. The mean pore size of the particulate removal means 28 should range from about 0.1 to about 5.0, more preferably from about 0.1 to about 1.0, and most preferably from about 0.10 to about 0.5 microns.

The particulate removal means 28 can include a membrane layer 96 if the pore size of the porous walls 72 is too large to remove the desired particulate material 56. The membrane layer 96 can be formed from a variety of suitable materials and deposited by known techniques. Such techniques include viscous coating, filtration, and slip casting.

Preferably, the particulate removal means 28 is composed of a material that is substantially inflammable at temperatures less than about 800° F. and has a melting point above that temperature. Suitable materials include ceramics, glass bonded ceramics, glasses, sintered metals, cermets, resins or organic polymers, and combinations thereof.

The backflush system 36 removes the collected particulate material layer 64 from the particulate removal means 28 by directing a cleaning gas stream 100 having a direction of flow opposite to the input gas stream 60 into the duct 104 downstream of the particulate removal means 28. The cleaning gas stream 100 dislodges the collected particulate material layer 64 which falls into the hopper 32 for disposal. The backflush system 36 is generally a compressor (not shown) to provide a compressed gas as the cleaning gas stream 100 and a venturi (not shown) downstream of the compressor to increase the velocity of the cleaning gas stream 100 before contacting the particulate removal means 28.

Alternative filter configurations other than that shown in FIGS. 2 and 3 are possible, depending upon the filter capacity and filtration area required for the input gas stream 60.

The mercury collection means 40 in the mercury removal assembly 24 removes mercury-containing compounds 108 from the treated gas stream 68 by means of a regenerable mercury collection surface. The mercury collection surface removes the mercury-containing compounds 108 from the treated gas stream 68 by adsorption.

While not wishing to be bound by any theory, it is believed that the mercury-containing compounds 108 are adsorbed by the mercury collection surface through the amalgamation of the mercury atoms in the mercury-containing compounds 108 with a metal that is a part of the mercury collection surface. The metal shall hereinafter be referred to as the sorbent. It is believed that through amalgamation the mercury atom dissolves in the sorbent, thereby separating the mercury atom from the remaining atoms in the mercury-containing compound. The mercury in the mercury-containing compound is thus amalgamated in elemental form with the sorbent. The amalgamation reaction is believed to be a surface reaction; that is, the mercury atom is believed to react with only the outer layers of sorbent atoms on the sorbent surface.

A suitable sorbent for the absorption of mercury-containing compounds 108 on the mercury collection surface should have certain properties. The sorbent should have a mercury adsorptive capacity that is preferably no less than about 0.1 microgram/cm$^2$; a mercury desorption temperature that is no less than about 500° F.; and an ability to be regenerated no less than about 10 times with no more than a 50% decrease in mercury adsorptive capacity. The sorbent is preferably one or more metals selected from Groups IA, IB and III of the Periodic Table of Elements, more preferably gold, silver, cesium, sodium, palladium, potassium, platinum, copper, and mixtures thereof, and most preferably gold.

Gold is the most preferred metal for mercury adsorption due to the high affinity of mercury for gold, the ability of gold to collect all forms of mercury, the ability of gold to be applied readily to a variety of substrates, and the general inertness of gold relative to other compounds in the input gas stream 60, such as sulfur oxides and nitrogen oxides.

The mercury collection efficiency of the sorbent is a function of the sorbent temperature, degree of surface saturation of the sorbent, and contact time between the sorbent and the treated gas stream 68. The sorbent temperature should be below the desorption temperature of the mercury and more preferably less than about 600° F. The sorbent should be regenerated when the mercury collection efficiency of the sorbent is inadequate to reduce mercury concentrations in the treated gas stream to desired levels.

The amount of sorbent required to treat the treated gas stream 68 depends upon the concentration of mercury-containing compounds in the input gas stream 60, the mercury adsorptive capacity of the sorbent, the surface area of the sorbent, and the desired frequency of regeneration of the sorbent. Preferably, the sorbent should be present in an amount that is about 2.0 to about 100 times and more preferably about 2 to about 10 times, the stoichiometric amount of sorbent necessary to remove enough mercury-containing compounds from the input gas stream 60 between regeneration cycles to reduce the total mercury concentration to the desired level. Preferably, the period between the regeneration cycles ranges from about 1 to about 1,000 hours and more preferably from about 150 to about 1,000 hours.

Figure 4:
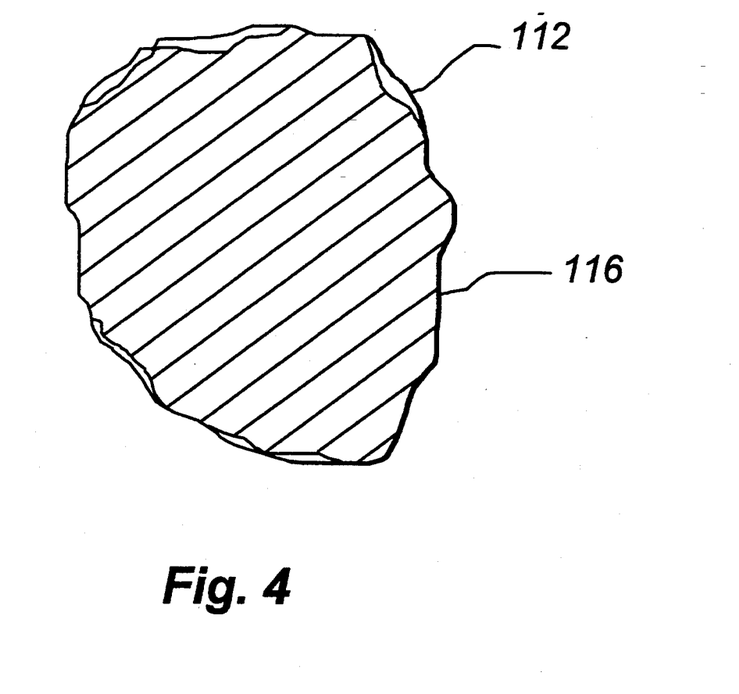
FIG. 4 is a cross-sectional illustration of the mercury collection surface on a carrier substrate.

The sorbent is typically located on a carrier substrate. Referring to FIG. 4, the sorbent 112 is located on a carrier substrate 116, typically as a thin, substantially discontinuous layer. The thickness of the layer preferably ranges from about 5 to about 500, more preferably from about 5 to about 250, and most preferably from about 5 to about 25 angstroms.

A suitable carrier substrate 116 should possess a number of properties. The carrier substrate 116 should have a surface area ranging from about 1 to about 100 m$^2$/gram, more preferably from about 30 to about 100 m$^2$/gram, and most preferably from about 50 to about 100 m$^2$/gram; be chemically inert with respect to other constituents of the input gas stream 60; be thermally stable at temperatures below about 800° F.; and have a coefficient of thermal expansion that is no more than about $1 \times 10^{-5}$ cm/cm. A suitable carrier substrate 116 is typically carbons, zeolites, ceramics, spun materials, metal sinters, aluminas, and mixtures thereof.

The size of the carrier substrate 116 depends upon the maximum acceptable pressure drop across the mercury collection means 40. If the pressure drop is too high, the mercury collection means 40 can interfere with the flow of input gas stream 60 through the particulate removal means 28 and removal of the collected particulate material layer 64 from the particulate removal means 28. The total pressure drop across the mercury collection means 40 should be no more than about 1.0 psi. Preferably, the carrier substrate 116 has an average size ranging from about 0.1 to about 10 mm.

The sorbent is generally deposited on the carrier substrate 116 by chemical evaporation techniques. In the case of a gold sorbent, a solution or slurry containing gold compounds dissolved in a solvent, such as water, is applied to the surface of the carrier substrate 116. The gold compound can include gold, gold chloride, other gold salts, and mixtures thereof. The solvent is evaporated from the surface of the carrier substrate 116 by heating the carrier substrate 116 to a temperature no less than about 210° F., leaving the gold compound deposited on the carrier substrate 116. The carrier substrate 116 can be contacted with a reducing gas, such as hydrogen, to reduce the gold compound to elemental gold. The gold compound can also be thermally reduced to elemental gold. As will be appreciated, other generally known techniques can be used to deposit the sorbent on the carrier substrate 116 including chemical vapor deposition, electroless plating, electrolytic plating, vacuum deposition, ion exchange, and liquid dispersions.

In the preferred embodiment of FIG. 4, the sorbent is located on a plurality of separate mercury collection surfaces on separate carrier substrates 116. In an alternative embodiment, the sorbent is located on a surface of only one carrier substrate rather than a plurality of separate carrier substrates. In this embodiment, the sorbent is generally located on a unitary substrate, such as the particulate removal means 28. As used herein, "unitary substrate" refers to a single, substantially continuous substrate that contains substantially all of the sorbent. The unitary substrate is typically a sorbent applied to a static mixer element, screen, mesh or gauze material, or one or more surfaces of the particulate removal means 28 as discussed below. In many applications, it is preferred to apply the sorbent on a plurality of carrier substrates 116 rather than a unitary substrate to provide a higher surface area for mercury collection than is typically possible with a unitary substrate. The higher surface area permits the sorbent to be regenerated less frequently than for a unitary substrate having a lower surface area.

The heating means 44 regenerates the sorbent by releasing mercury from the sorbent. The heating means 44 selectively elevates the temperature of the mercury collection means 40 to above the desorption temperature of the mercury. The sorbent temperature during regeneration ranges from about 500° F. to about 800° F., more preferably from about 600° F. to about 800° F., and most preferably from about 650° F. to about 800° F. In comparison, the temperature of the input gas stream 60 and the mercury collection means 40 during mercury collection typically is less than about 600° F.

While not wishing to be bound by any theory, it is believed that mercury desorbs from the sorbent due to an alteration of the equilibrium state of the amalgam. As the temperature of the sorbent increases, the solubility of the mercury in the sorbent decreases. As the solubility of the mercury decreases, mercury will desorb from the sorbent in the form of elemental mercury vapor.

The heating means 44 can be located in a variety of positions. The heating means 44 can be operably connected to the duct 104, the particulate removal means 28, and the mercury collection means 40 depending on the system configuration.

The heating means 44 can be any mechanism by which the temperature of the defined region is elevated, including, for example, a heated gas injected into the defined region, or heating elements positioned within the defined region. The preferred heating means 44 is an assembly for injecting a heated inert gas, including nitrogen, air, steam, and mixtures thereof, which is heated to the desired temperature and injected into the duct 104 to contact the mercury collection means 40. The heating means 44 can also be any other type of heater known in the art, such as a gas burner.

The mercury removal means 48 removes the mercury from a defined region 120a containing the mercury collection means 40 and particulate removal means 28 after the mercury is released from the mercury collection means 40. The defined region 120a is formed using a sealing means, such as valves 124, 128, to seal the mercury collection means 40 from the input gas stream 60. Since the mercury is typically released from the mercury collection means 40 as elemental mercury vapor, the mercury removal means 48 is generally either a compressor to inject a carrier gas into the defined region 120a or a vacuum means to provide reduced pressure in the defined region 120a. In either case, the mercury removal means 48 is generally operatively connected to the duct 104 in the defined region 120a.

The mercury removal means 48 causes the mercury to be transported to the mercury recovery means 52 for selective recovery of the mercury. The mercury recovery means 52 can be a condensation surface having a temperature no more than the dew point of the mercury vapor. Preferably, the condensation surface has a temperature less than about 50° F. The condensed mercury is collected by the mercury recovery means 52 for disposal or sale. Other methods can be used by the mercury removal means 52 to selectively recover mercury, including adsorption on another substrate, scrubbing, and chemical precipitation.

To prevent water from condensing with and contaminating the mercury, the mercury recovery means 52 can include a water removal means (not shown) to separate water from the mercury. The water removal means can be a gravity separator or any other known means for the removal of water from mercury. As will be appreciated, a variety of other devices can be included in the mercury recovery means 52 to remove other possible mercury contaminants.

The structure of the various embodiments of the mercury collection means 40 will now be discussed. In several of these embodiments the particulate removal means 28 is a filter combined with the mercury collection means 40 as an integrated unit. In such embodiments, the mercury collection means 40 typically contacts a surface of the particulate removal means 28.

An embodiment integrating the particulate removal means 28 and the mercury collection means 40 is shown in FIG. 2. Sorbent particles 132 are removably disposed within the second interconnected channels 80. As used herein, "sorbent particles" refers to the sorbent either alone or as applied to a carrier substrate 116.

To retain the sorbent particles 132 in the second interconnected channels 80, a retaining wall 136 is removably attached to the outlet 88 of the second interconnected channels 80. The retaining wall 136 is preferably a porous material having a pore size smaller than the size of the sorbent particles 132. The retaining wall 136, for example, may be a screen, gauze or mesh material. The retaining wall 136 is generally mechanically attached to the particulate removal means 28 by screws or other mechanical devices.

Figure 5:
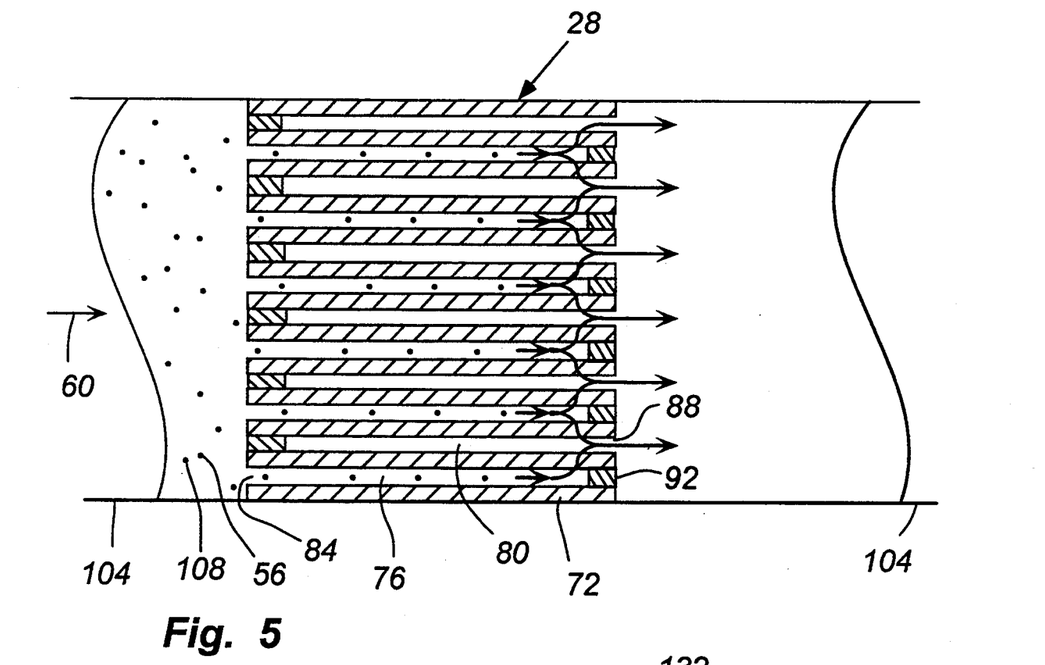
FIG. 5 is a cross-sectional illustration of another embodiment of the particulate removal means and the mercury collection means.
Figure 5A:
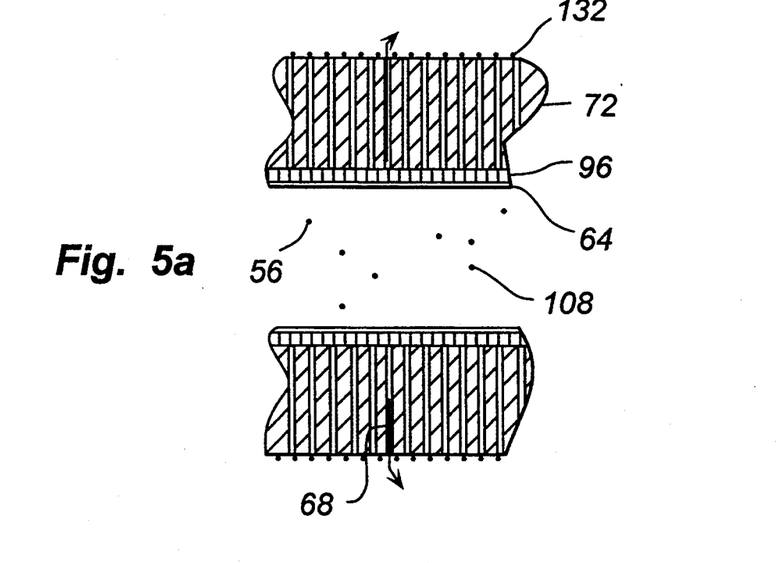
FIG. 5a is an expanded, cross-sectional illustration of a portion of the second interconnected channels in the embodiment of FIG. 5.

In another embodiment shown in FIG. 5, the sorbent particles 132 are supportably engaged by the porous walls 72 in the second interconnected channels 80. The sorbent particles 132 are deposited on the porous walls 72 by any of the above-noted techniques.

Figure 6:
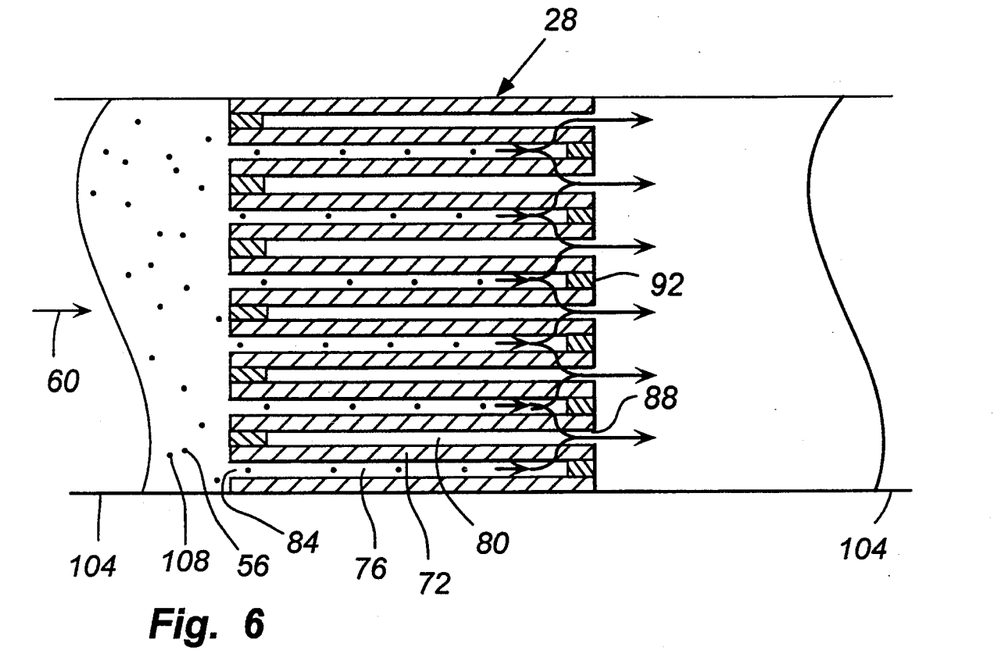
FIG. 6 is a cross-sectional illustration of another embodiment of the particulate removal means and the mercury collection means.
Figure 6A:
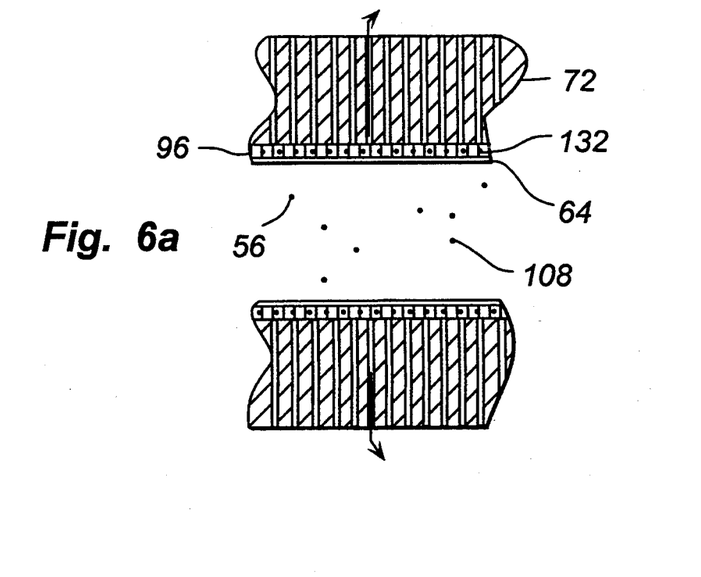
FIG. 6a is an expanded, cross-sectional illustration of a portion of the first interconnected channels in the embodiment of FIG. 6.

In another embodiment shown in FIG. 6, the sorbent particles 132 are located in the interstitial pore volume of the membrane layer 96. The sorbent particles 132 can be included in the membrane layer 96 by including the sorbent particles 132 in the material used to form the membrane layer 96. The sorbent particles 132 can also be applied in the interstitial pore volume of the membrane layer 96 by a variety of other techniques including chemical vapor deposition, vacuum deposition, electrolytic plating, electroless plating, liquid dispersion, and ion exchange.

Figure 7:
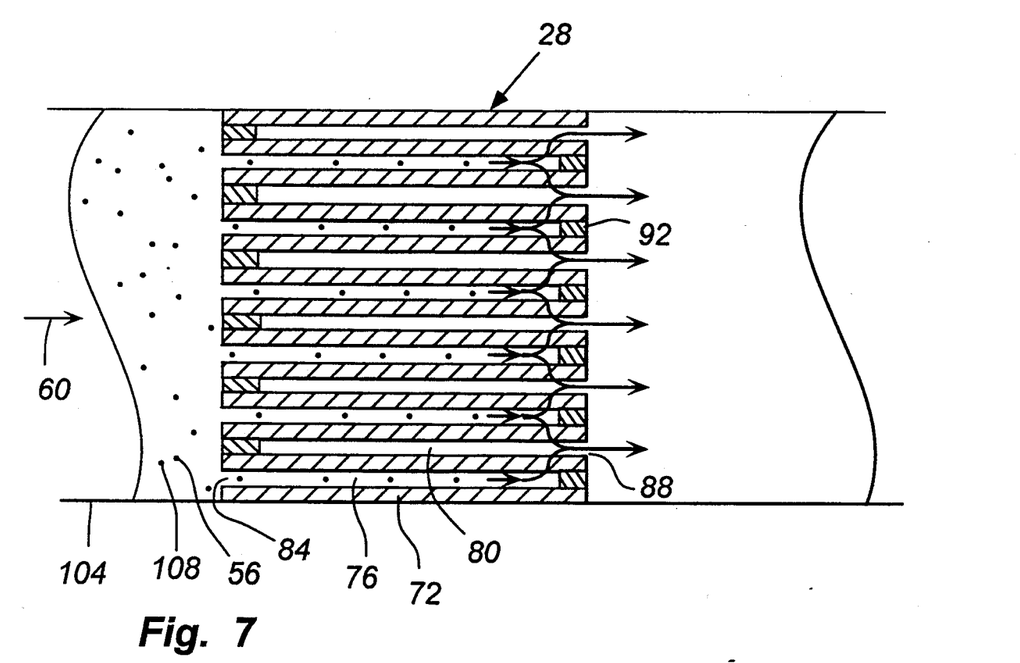
FIG. 7 is a cross-sectional illustration of another embodiment of the particulate removal means and the mercury collection means.
Figure 7A:
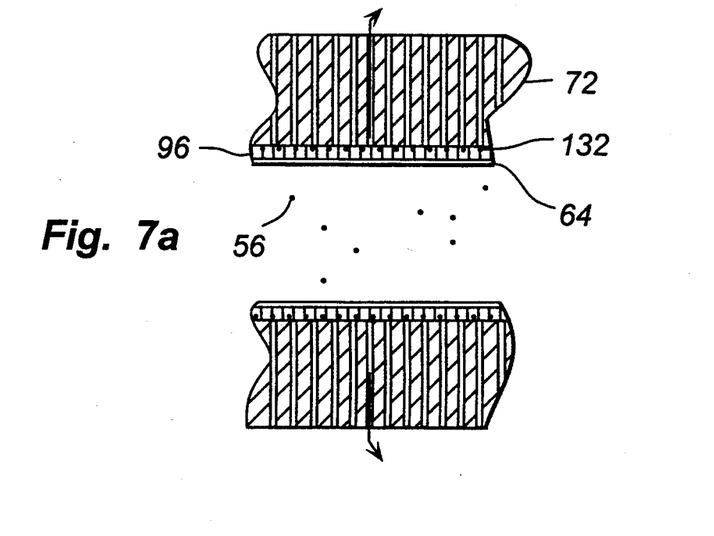
FIG. 7a is an expanded, cross-sectional illustration of a portion of the first interconnected channels in the embodiment of FIG. 7.

In another embodiment shown in FIG. 7, the sorbent particles 132 are located between the membrane layer 96 and the porous wall 72. To realize this configuration, the sorbent particles 132 are deposited on the porous wall 72 before deposition of the membrane layer 96. The sorbent particles 132 can be deposited on the porous wall 72 by any of the above-noted techniques.

Figure 8:
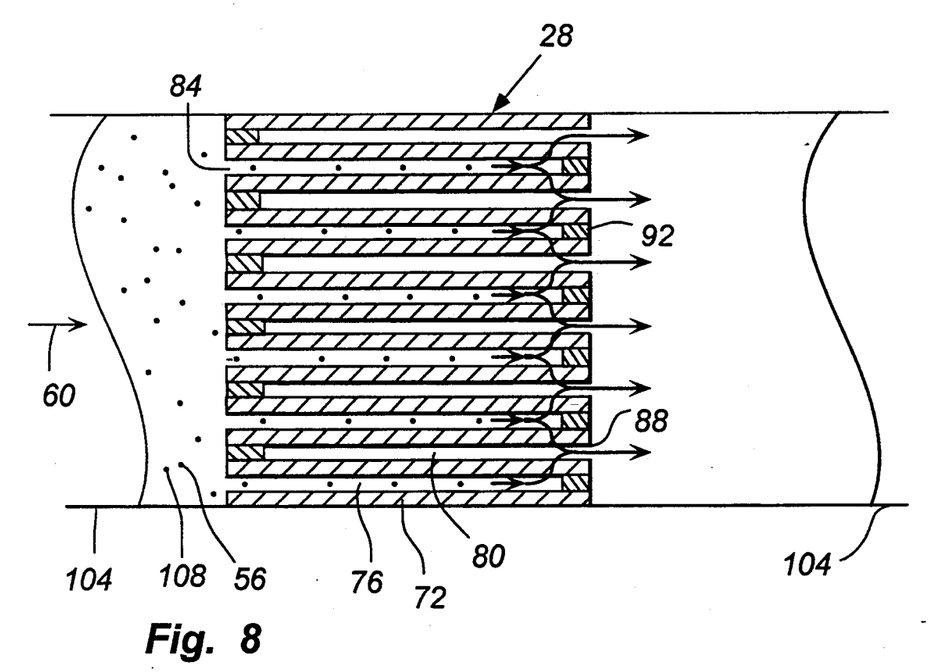
FIG. 8 is a cross-sectional illustration of another embodiment of the particulate removal means and the mercury collection means.
Figure 8A:
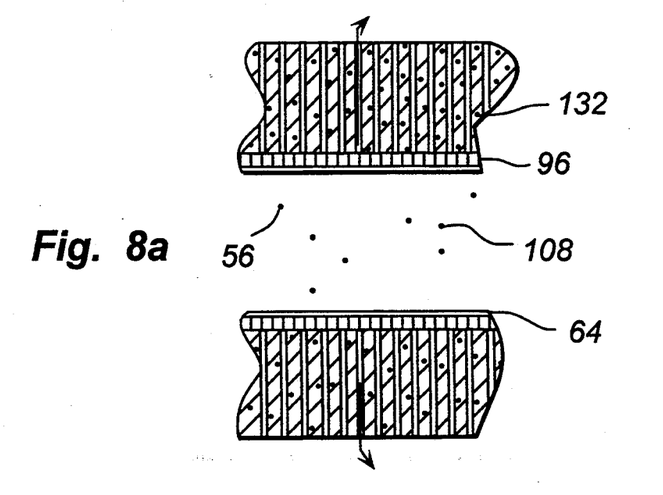
FIG. 8a is an expanded, cross-sectional illustration of a portion of the porous wall of the embodiment of FIG. 8.

In another embodiment shown in FIG. 8, the sorbent particles 132 are located in the porous walls 72. This configuration is attained by incorporating the sorbent particles 132 in the material used to form the particulate removal means 28.

Figure 9:
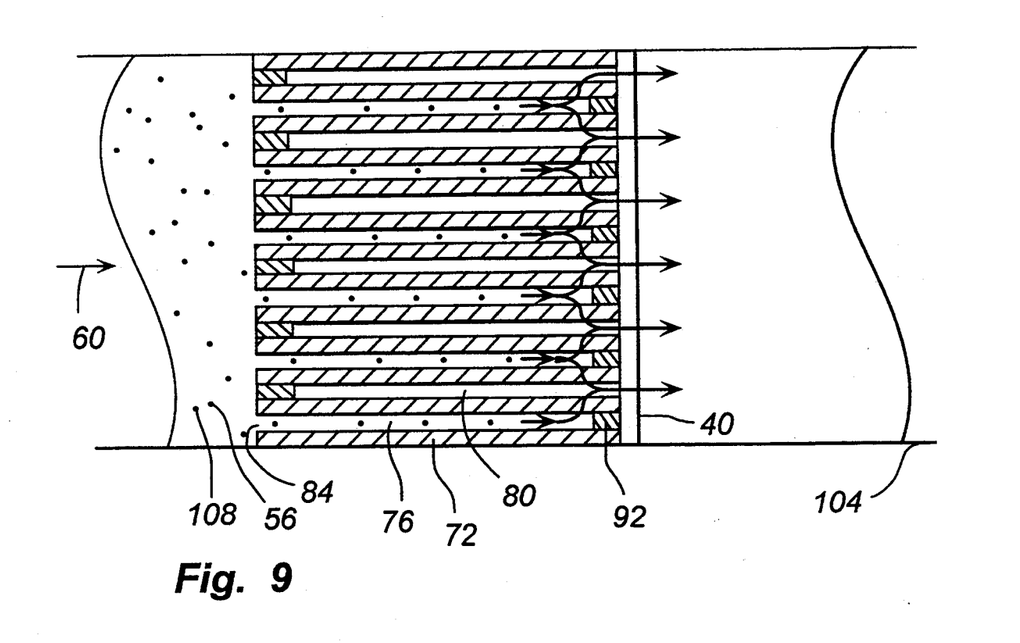
FIG. 9 is a cross-sectional illustration of another embodiment of the particulate removal means and the mercury collection means.
Figure 9A:
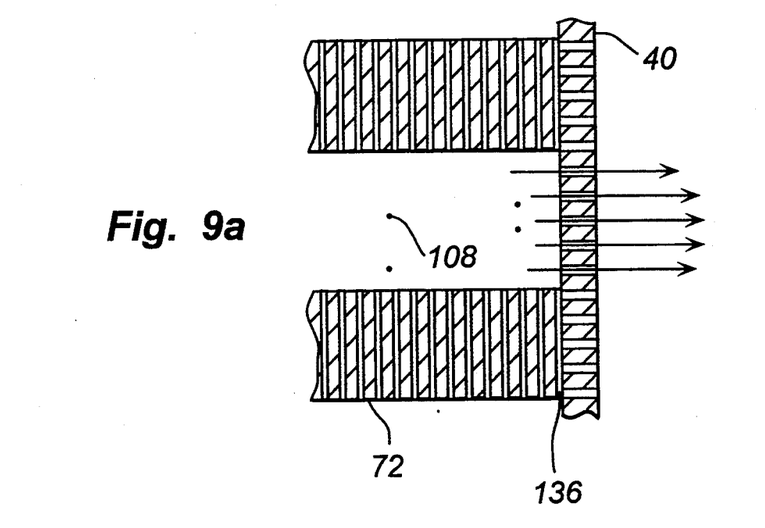
FIG. 9a is an expanded, cross-sectional illustration of a portion of the embodiment of FIG. 9.

In another embodiment, shown in FIG. 9, the mercury collection means 40 is connected to the output face 136 of the particulate removal means 28. In this embodiment, the mercury collection means 40 can be a sorbent applied to a unitary substrate as described above or a bed of sorbent particles 132 as described below. The connection between the mercury collection means 40 and particulate removal means 28 can be removable or permanent, as desired.

In the various embodiments in FIGS. 5 through 8, the attachment of the sorbent particles 132 to a surface of the particulate removal means 28 generally requires the replacement of the particulate removal means 28 when the sorbent particles 132 require replacement. Because the sorbent particles 132 typically have a shorter life than the particulate removal means 28, the premature replacement of the particulate removal means 28 can incur unnecessary expense. The embodiments shown in FIGS. 2 and 9 overcome this potential problem by allowing the sorbent particles 132 to be periodically replaced without replacement of the particulate removal means 28.

In another embodiment of the present invention, the particulate removal means 28 and the mercury collection means 40 are not integrated with one another as in the above-described embodiments but are physically separate units. As will be appreciated, this embodiment is particularly applicable to retrofitting existing particulate removal systems to remove mercury-containing compounds as well as particulate material.

Figure 10:
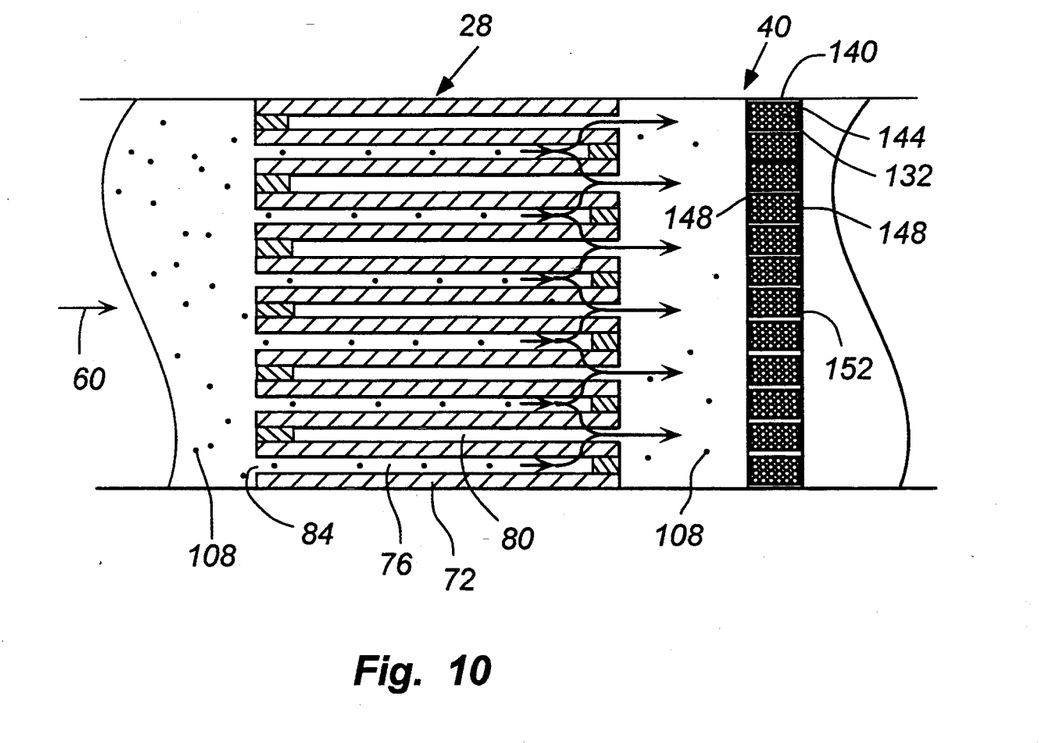
FIG. 10 is a cross-sectional illustration of another embodiment of the particulate removal means and the mercury collection means.

Referring to FIG. 10, the particulate removal means 28 is located in the duct 104 upstream of the mercury collection means 40. The mercury collection means 40 includes a housing 140 having a series of compartments 144 containing the sorbent particles 132. The exterior surfaces 148 of the housing 140 can be any screen, mesh, gauze, or any other porous material having a pore size smaller than the size of the sorbent particles 132. The exterior surfaces 148 are substantially composed of any of the substances described above as possible components of the particulate removal means 28.

The compartments 144 are formed by a tray 152 connected to the exterior surfaces 148 of the housing 140. The tray 152 supports the sorbent particles 132 to prevent gravitational settling of the sorbent particles 132 in the housing 140 during use.

The size distribution and packing density of the sorbent particles 132 are selected to yield the above-noted pressure drop across the mercury collection means 132. Generally, the size distribution and packing density are the same as the sorbent particles 132 shown in FIG. 2. The space in each compartment 144 should be substantially filled with sorbent particles 132.

The particulate removal means 28 shown in FIG. 10 is a filter. Alternatively, the particulate removal means 28 can be an electrostatic precipitator located upstream of the mercury collection means 40.

An existing particulate removal system can be retrofitted with this embodiment for the removal of mercury relatively easily. The mercury collection 40 is placed in the duct 104 downstream of the particulate removal means 28 and a valve 128 and upstream of a valve 124. The heating means 44 is operatively connected with the duct 104 to provide for regeneration of the sorbent. The mercury removal means 48 is also operatively connected to the duct 104 within the defined region 120a to provide for removal of the mercury-containing compounds released from the sorbent during regeneration.

Like the above-described embodiments, the particulate removal means 28 in this embodiment is generally contained within the defined region 120a along with the mercury collection means 40.

In this embodiment, the mercury collection means 10 has other possible configurations. For example, the mercury collection means 40 can be sorbent applied to a unitary substrate as discussed above. The particulate removal means 28 can also be located outside the defined region 120b. In this configuration, the particulate removal means 28 and mercury collection means 40 are separated by a valve 156. The mercury collection means 40 is contained within the defined region 120b. This embodiment permits the mercury collection means 40 (but not the particulate removal means 28) to be selectively heated by the heating means 44 during sorbent regeneration.

The operation of the improved system will now be described with reference to FIGS. 1 and 2. The particulate material 56 in the input gas stream 60 are first removed by the particulate removal assembly 20 to produce the collected particulate material layer 64 and treated gas stream 68. In the particulate removal assembly 20, the input gas stream 60 flows through the membrane layer 96 and porous wall 72 to form the collected particulate material layer 64 and treated gas stream 68.

To remove the collected particulate material layer 64 from the particulate removal means 28, the particulate removal means 28 is sealed from the input gas stream 60 by closing valve 128 and either valve 156 or 124. After closing the valves, the backflush system 36 passes a cleaning gas stream 100 through the particulate removal means 28 in a direction opposite to the input gas stream 60. The collected particulate material layer 64 is removed from the particulate removal means 28 by the cleaning gas stream 100 and is collected in the hopper 32. Following collected particulate material layer removal, the valves are reopened and input gas stream 60 is again passed through the particulate removal means 28. The frequency of collected particulate material layer removal from the particulate removal means 28 is typically from about 0.5 to about 8 hours. Alternatively, the particulate removal means 28 may be cleaned of the collected particulate material layer 64 during operation of the system. In this embodiment, the backflush system 36 passes a cleaning gas stream 100 through the particulate removal means 28 against the flow of the input gas stream 60. The pressure of the cleaning gas stream 100 should exceed the opposing pressure of the input gas stream 60.

After removal of the particulate material 56 by the particulate removal assembly 28, the mercury removal assembly 24 removes the mercury-containing compounds 108 from the treated gas stream 68. The treated gas stream 68 contacts the sorbent particles 132 in the mercury removal assembly 24, which adsorbs the mercury in the mercury-containing compounds 108 to form an output gas stream 160. The output gas stream 160 is discharged through the outlet 88 of the second interconnected channels 80.

To regenerate the sorbent in the mercury collection means 40, the mercury collection means 40 is sealed from the treated gas stream 68 and the downstream section of the duct 104 by closing, as appropriate, either valves 128 and 124 to form the defined region 120a or valves 156 and 124 to form the defined region 120b containing the mercury collection means 40. The heating means 44 then elevates the temperature of the mercury collection means 40 to desorb the mercury from the sorbent.

The mercury removal means 48 removes the elemental mercury vapor from the defined region 120 and transports the vapor to the mercury recovery means 52. The mercury recovery means 52 condenses the mercury and collects the condensate for disposal or sale. To resume operation after regeneration of the sorbent, the appropriate valves are reopened and the treated gas stream 68 is again passed through the mercury collection means 40.

It is desired that the sorbent be regenerated less frequently than removal of the collected particulate material layer 64 from the particulate removal means 28.

EXAMPLE 1

A simulated flue gas stream containing 1.3 ppm(v/v) of elemental mercury was flowed through a gold sponge held at about 300° F. to match flue gas temperatures from a typical combustion source. The total concentration of mercury-containing compounds in the gas downstream of the gold sponge was measured to be below the 3 ppb(v/v) detection limit of the mercury analyzer, indicating a nearly complete mercury removal rate by the gold sponge. This test was run for a period of time, then the inlet flow of gas was shut off and the temperature of the sponge was increased to 500° F. to regenerate the gold sponge. The adsorbed mercury was released by the gold sponge. The concentration of mercury in the atmosphere surrounding the gold sponge during regeneration was 3.3 ppm(v/v).

EXAMPLE 2

A simulated flue gas stream containing 100 ppb(v/v) of elemental mercury was flowed through a bed of sorbent particles at about 300° F. The sorbent particles were gold deposited on activated carbon. The total concentration of mercury-containing compounds in the gas downstream of the bed was measured to be below 1 ppb(v/v), indicating a nearly complete mercury removal rate by the sorbent particles. After approximately 25 hours, the inlet flow of the gas was shut off and the temperature of the bed was increased to approximately 500° F. to regenerate the sorbent particles. The adsorbed mercury was released by the bed, producing a concentration of mercury in the atmosphere surrounding the bed during regeneration of more than about 100 ppb(v/v).

These experiments illustrate that a gold sorbent can effectively capture mercury at processing temperature and release it upon heating the gold sorbent to higher temperatures.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A system for removing particulate material and mercury-containing compounds from an input gas stream, comprising:
   channel means for defining the flow of the input gas stream between an inlet and an outlet of the channel means;
   particulate removal means positioned across the input gas stream in the channel means for removing the particulate material from the input gas stream;
   mercury collection means for removing the mercury-containing compounds from the input gas stream, the mercury collection means being positioned downstream of the particulate removal means within a defined region of the channel means and including a mercury collection surface;
   means for selectively elevating the temperature within the defined region to release the mercury-containing compounds from the collection surface, the means for selectively elevating the temperature being in operative contact with the defined region; and
   means for removing the mercury-containing compounds from the defined region after the mercury-containing compounds are released from the collection surface.

2. The system as claimed in claim 1, wherein:
the mercury-containing compounds are selected from the group consisting of elemental mercury, mercuric chloride, organomercuric compounds, and mixtures thereof.

3. The system as claimed in claim 1, wherein:
the particulate removal means is a filter having a pore size less than about 5.0 microns.

4. The system as claimed in claim 1, wherein:
the particulate removal means is composed substantially of a material that is thermally stable at temperatures no less than about 800° F.

5. The system as claimed in claim 1, wherein:
the particulate removal means is composed substantially of a material selected from the group consisting of ceramics, glass bonded ceramics, glasses, sintered metals, cermets, resins or organic polymers, and mixtures thereof.

6. The system as claimed in claim 1, wherein:
the particulate removal means is positioned within the defined region.

7. The system as claimed in claim 1, wherein:
the mercury collection surface has a mercury adsorptive capacity no less than about 0.1 microgram/cm$^2$.

8. The system as claimed in claim 1, wherein:
the mercury collection surface has a mercury adsorption temperature that is no less than about 500° F.

9. The system as claimed in claim 1, wherein:
the mercury collection surface has an ability to be regenerated no less than about 10 times with no more than a 50% decrease in mercury adsorptive capacity.

10. The system as claimed in claim 1, wherein:
the mercury collection surface has a thickness ranging from about 5 to about 500 angstroms.

11. The system as claimed in claim 1, wherein:
the mercury collection surface includes a metal selected from the group consisting of gold, silver, cesium, sodium, palladium, platinum, potassium, copper, and mixtures thereof.

12. The system as claimed in claim 1, wherein:
the pressure drop across the mercury removal means is no less than about 1.0 psi.

13. The system as claimed in claim 1, wherein:
the mercury collection means contacts a surface of the particulate removal means.

14. The system as claimed in claim 1, wherein:
the mercury collection means is defined by separate mercury collection surfaces on separate carriers.

15. The system as claimed in claim 14, wherein:
the mercury collection means comprises a bed of separate mercury collection surfaces on separate carriers.

16. The system as claimed in claim 14, wherein:
the carrier has a surface area from about 1 to about 100 m$^2$/gram.

17. The system as claimed in claim 14, wherein:
the carrier has a coefficient of thermal expansion less than about $1 \times 10^{-5}$ cm/cm.

18. The system as claimed in claim 14, wherein:

the carrier has an average size from about 0.1 to about 10 mm.

19. The system as claimed in claim 14, wherein:
the carrier is thermally stable at temperatures below about 800° F.

20. The system as claimed in claim 14, wherein:
the carrier is selected from the group consisting of carbons, zeolites, ceramics, spun materials, metal sinters, aluminas, and mixtures thereof.

21. The system as claimed in claim 14, wherein:
the separate carriers are supportably engaged by a surface of the particulate removal means.

22. The system as claimed in claim 1, wherein:
the particulate removal means includes a plurality of first and second interconnected channels extending longitudinally relative to the direction of flow of the input gas stream, the first interconnected channels having an inlet for the input gas stream and a porous surface to remove particulate materials from the input gas stream to yield a treated gas stream and the second interconnected channels having an outlet to discharge the treated gas stream.

23. The system as claimed in claim 22, wherein:
the mercury collection means is disposed within the second interconnected channels.

24. The system as claimed in claim 22, wherein:
the porous wall separates the first and second interconnected channels and the mercury collection means is located adjacent to the porous wall.

25. The system as claimed in claim 22, wherein:
the mercury collection means is disposed within the porous wall.

26. The system as claimed in claim 22, wherein:
the mercury collection means is removably disposed within the second interconnected channels and the outlet of the second interconnected channels includes retaining means for holding the mercury collection means in the second interconnected channels.

27. The system as claimed in claim 26, wherein:
the retaining means has a plurality of pores having a size smaller than the separate carriers.

28. The system as claimed in claim 1, wherein:
the means for selectively elevating the temperature within the defined region includes a heater in contact with at least one of the following: the channel means, the particulate removal means, and the mercury collection means.

29. The system as claimed in claim 1, wherein:
the means for removing the mercury-containing compounds from the defined region comprises an injection means for injecting a carrier gas into the defined region to entrain the mercury-containing compounds therein and a means for removing the carrier gas from the defined region.

30. The system as claimed in claim 1, wherein:
the mercury-containing compounds released from the mercury collection surface are substantially elemental mercury vapor;
and further comprising:
mercury recovery means for recovering elemental mercury released from the mercury collection surface, the mercury recovery means including a condensation surface having a temperature no more than the dew point of the elemental mercury vapor.

31. A method for removing particulate material and mercury-containing compounds from an input gas stream, comprising the steps of:
directing the input gas stream containing the particulate material and mercury-containing compounds through a particulate removal device to collect the particulate material and provide a treated gas stream with a reduced content of the particulate material;
contacting the treated gas stream with a mercury collection surface;
adsorbing the mercury-containing compounds on the mercury collection surface to provide an output gas stream;
elevating the temperature of the mercury collection surface to release the mercury-containing compounds from the mercury collection surface; and
collecting the mercury-containing compounds released from the mercury collection surface.

32. The method as claimed in claim 31, wherein the adsorbing step comprises:
amalgamating elemental mercury with a metal selected from Groups IA, IB and III of the Periodic Table of Elements.

33. The method as claimed in claim 31, wherein the elevating step comprises:
elevating the temperature from a first temperature of no more than about 600° F. to a second temperature greater than the first temperature and no less than about 500° F.

34. The method as claimed in claim 31, wherein the elevating step comprises:
sealing the mercury collection surface from the input gas stream; and
removing the mercury-containing compounds released from the mercury collection surface.

35. The method as claimed in claim 34, wherein the removing step comprises:
contacting the mercury-containing compounds released from the mercury collection surface with a carrier gas to remove the released mercury-containing compounds.

36. The method as claimed in claim 31, wherein:
the mercury-containing compounds released from the mercury collection surface substantially comprise elemental mercury vapor and the collecting step comprises condensing the elemental mercury vapor on a condensation surface.

37. The method as claimed in claim 36, wherein:
the condensation surface has a temperature no more than the dew point of the elemental mercury vapor.

38. The method as claimed in claim 36, wherein the collecting step comprises:
separating the mercury condensate from water that condensed with the mercury during the condensing step.

39. The method as claimed in claim 31, further comprising:
contacting the filter with a cleaning gas stream having a direction of flow opposite the direction of flow of the input gas stream to remove the particulate material from the filter.

40. The method as claimed in claim 31, wherein:
the mercury-containing compounds have a concentration in the input gas stream ranging from about 0.1 to about 1,000 ppb(v/v).

* * * * *